UNITED STATES PATENT OFFICE.

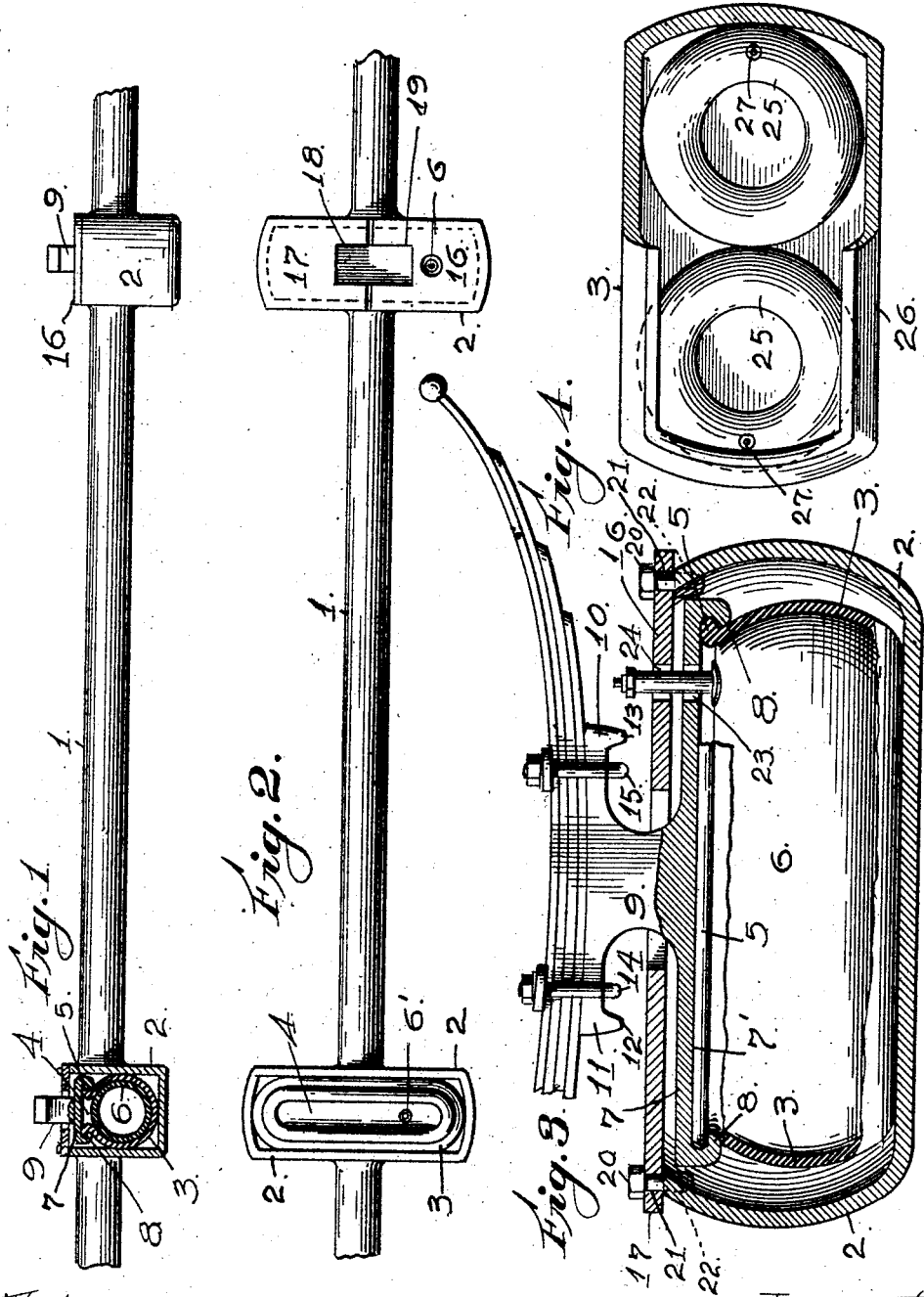

CHARLES J. STOVEL, OF SAN FRANCISCO, CALIFORNIA.

PNEUMATIC SUPPORT FOR VEHICLES.

1,037,360.   Specification of Letters Patent.   Patented Sept. 3, 1912.

Application filed January 22, 1912. Serial No. 672,617.

*To all whom it may concern:*

Be it known that I, CHARLES J. STOVEL, a citizen of the United States, residing in the city and county of San Francisco and State of California, have invented certain new and useful Improvements in Pneumatic Supports for Vehicles, of which the following is a specification.

The hereinafter described invention relates to an improved air cushioning device adapted for use on all of the lighter types of vehicles, where easy riding is desired, but is particularly designed for use on automobiles, and the principal object of my invention is to provide a device, the use of which will supplant the pneumatic tires now in use and absorb and eliminate all road shocks before the same are transmitted to the vehicle body, and by doing so, dispense with the costly pneumatic tire now universally in use.

Another object is to provide an air cushioning device interposed between the vehicle axle and the springs which support the body of the vehicle, thus providing a pneumatic seat for the vehicle springs which will eliminate all shocks, jars and jolts transmitted thereto before the same cause a vibration of the vehicle springs.

A further object is to provide a simple, easily constructed, inexpensive device of but few parts, which will perform all the functions of absorbing shocks as are now performed by the costly pneumatic tire and thus dispense with the equipping of automobiles with pneumatic tires.

The improved device comprises an open topped receptacle formed in or supported by the vehicle axle at a point directly below each vehicle spring, and in which is adapted to be seated an inflatable pneumatic tube, which supports a movable plate, the plate providing a seat for the vehicle spring, the receptacle being provided with a detachable cover which incloses the pneumatic tube within the receptacle and limits the upward and downward movement of said movable plate.

With the above mentioned and other objects in view, the invention consists in the novel construction and combination of parts hereinafter fully described, illustrated in the accompanying drawings, and pointed out in the claims hereto appended; it being understood that various changes in the form, proportion, size and minor details of construction may be resorted to without departing from the spirit or sacrificing any of the advantages of the invention.

To comprehend the invention reference should be had to the accompanying sheet of drawings illustrating a completely constructed device for carrying out the invention, wherein—

Figure 1 is a front elevation of my improved device, there being one cushioning device under each spring, with the front of one of the receptacles broken away disclosing the outer casing and inner tube therein, the movable plate, the stationary or cover plates for the top of the receptacle, and the manner of securing the outer casing to the movable plate. Fig. 2 is a top plan view of my improved device, with the cover of one of the receptacles removed, disclosing the outer casing and the inner tube seated therein, and the other receptacle with the cover applied. Fig. 3 is a horizontal sectional view of one of the receptacles with the outer casing broken away, disclosing the inner tube, the movable plate, the arm projecting upwardly therefrom for supporting the vehicle spring, the cover plates, and the valve stem for inflating the inner tube. Fig. 4 is a top plan view of one of the receptacles with the cover plates and the movable plate removed, disclosing a modified form of inner tubes, each provided with a separate inflating valve.

Referring more particularly to the drawings, the reference numeral 1 designates a suitable vehicle axle adapted to carry at its ends suitable vehicle wheels, and provided within its length, at points where the vehicle springs are normally supported, with downwardly bent seats or recesses 2, having side and end walls, the whole forming a receptacle. The receptacles 2 extend transversely of the axle 1 and are preferably provided with straight sides and rounded end walls, and the construction of each receptacle and the parts associated therewith being the same, a description of one is thought will suffice.

Positioned within the receptacle 2 and adapted to extend longitudinally thereof is a flexible rubber outer casing or cover 3, preferably oval in shape and having a contracted opening 4 at the top thereof, around the edge of which is provided an outwardly extending clencher bead 5, of the type generally used on outer casings of pneumatic tires, the outer casing 3 providing a housing for a substantially oval inner tube or air containing chamber 6 which is provided on its upper surface adjacent one end thereof with an inflating valve 6'.

Mounted to reciprocate in the receptacle above the outer casing 3 and inner tube 6 is a plate 7, having a flat under face 7' which is provided with an annular inwardly projecting flange 8 which is adapted to receive the annular bead 5 on the upper edge of the outer casing 4, thus providing a closure for the outer casing, to be applied after the inner tube 6 has been inserted therein. Projecting a short distance from the center of the upper surface of the movable plate 7 is an integral member or shank 9, provided at its upper end with oppositely extending alined arms 10 and 11, on which the vehicle spring is adapted to rest. The outer ends of the arms are formed with downwardly extending lips 12 and 13, which with the shank 9 provide seats for U-shaped bolts 14 and 15, positioned one on each side of the shank 9, the bolts encircling the arms and the spring, and clamp the two together. The plate 7 is confined in the receptacle by a detachable cover, formed of two plates 16 and 17, each of which is of a configuration equal to one-half of the open top of the receptacle 2, which plates are provided at their meeting edges with oppositely extending longitudinal cut out portions or slots 18 and 19, which provide an opening through which the shank 9 extends. The plates are detachably secured to the top of the receptacle by bolts 20 which project through bolt openings 21 in the periphery of the cover plates and which are alined with corresponding bolt openings 22 in the upper edge of the receptacle 2. The movable plate 7 and the cover plates 16 are provided respectively with circular alined openings 23 and 24 through which the valve stem 6' projects.

The parts being assembled as in the drawings, and air having been forced in through the inflating valve 6' until the required pressure is attained in the inner tube 6, this pressure generally being the same per cubic inch as is generally required in a pneumatic tire for supporting the same vehicle, it will be readily seen that when the vehicle is traveling over rough roads, the jars caused by the unevenness of the road will be taken up or absorbed by the inflated cushion, it being interposed between the axle and the movable plate 7, and before the shocks are transmitted to the vehicle spring. The air cushions perform the same function as the pneumatic tire, without the cost of maintenance that is required by the use of tires.

It is to be understood that my improved device does not perform the function of the shock absorber now commonly in use, for regulating the rapid expansion and contraction of the vehicle springs, but does provide an air cushioning means interposed between the vehicle springs and the axle for absorbing and eliminating all road shocks before the same are transmitted to the vehicle springs.

Should it be desired to remove the inner tube for any reason, it only requires that the cover plates be removed, the vehicle body jacked up withdrawing the plunger to which is secured the outer casing carrying the inner tube, the casing and tube are now exposed either for inspection or replacement as may be desired.

Fig. 4 discloses a modified form of air cushion consisting of two circular ring shaped inner tubes 25 adapted to be positioned side by side in the outer casing 26, and each provided with a separate inflating valve 27; this construction is such that if one tube punctures, the movable plate will be partly supported by the other until the defective tube can be replaced.

Having thus fully described my invention what is claimed as new and is desired to be protected by Letters Patent is—

1. In a pneumatic support for vehicles, in combination with a vehicle axle and a vehicle body, of a receptacle formed in said vehicle axle, an inflatable tube located in said receptacle, an outer casing for said tube, said casing being provided with an opening through which said tube is inserted, and a plunger mounted to reciprocate in said receptacle, said plunger being connected to and closing the opening in said outer casing and interposed between the vehicle body and said casing.

2. In a pneumatic support for vehicles, in combination with a vehicle axle and a vehicle body, of a receptacle formed in said vehicle axle, an inflatable pneumatic tube located in said receptacle, an outer casing surrounding said tube and provided with an opening through which said tube is inserted, a clencher bead on the upper peripheral edge of said opening, a plunger interposed between the vehicle body and said outer casing and provided on its under surface with a flange adapted to receive the clencher bead on said casing, close the opening therein and unite the two together, and a cover plate for said receptacle.

3. In a pneumatic support for vehicles, in combination with a vehicle axle and a vehicle spring, of a receptacle formed in said vehicle axle, an inflatable pneumatic tube located in said receptacle, an outer casing surrounding said tube and provided with an opening through which said tube is inserted, an outwardly projecting clencher bead on the upper peripheral edge of said opening, a plunger provided on its under face with an inwardly projecting flange adapted to engage the clencher bead on said outer casing, close the opening therein and unite the two together, a shank extending upwardly from said plunger and provided at its top with oppositely extended arms which provide a seat for said spring, and a cover plate for said receptacle, said cover plate being provided with an opening through which said shank extends.

In testimony whereof I have signed my name to this specification in the presence of two subscribing witnesses.

CHARLES J. STOVEL.

Witnesses:
 HARRY H. TOTTEN,
 D. B. RICHARDS.